Sept. 26, 1950    L. A. LEDGETT    2,523,508
THREE-DIMENSIONAL MODEL

Filed May 7, 1945    2 Sheets-Sheet 1

INVENTOR
LOWELL A. LEDGETT
BY
George H. Mortimer
ATTORNEY

Sept. 26, 1950      L. A. LEDGETT      2,523,508

THREE-DIMENSIONAL MODEL

Filed May 7, 1945      2 Sheets-Sheet 2

INVENTOR
LOWELL A. LEDGETT
BY
George H. Mortimer
ATTORNEY

Patented Sept. 26, 1950

2,523,508

UNITED STATES PATENT OFFICE 2,523,508

THREE-DIMENSIONAL MODEL

Lowell A. Ledgett, Ridgewood, N. J.

Application May 7, 1945, Serial No. 592,502

2 Claims. (Cl. 35—16)

The present invention relates to a three-dimensional model of an industrial structure and, more particularly, to a new combination of parts for constructing a three-dimensional scale model of an industrial structure for use in the planning and design of chemical plants and other comparable installations.

It has been customary heretofore in planning and designing an industrial structure such as a chemical plant or the like to draw up plans to scale on paper. Such plans necessitated at least a floor plan of each floor, a front and a side elevation. Pieces of equipment and the connections to such pieces of equipment such as electrical conduits, steam lines, feed lines, product lines, etc., were drawn in tentatively on the various sheets of drawings, erased and redrawn as often as necessary to work out their locations and arrangements. This was a time-consuming and laborious procedure. Some improvement in technique was achieved by the use of two-dimensional templates made to scale and corresponding in shape to the plan or elevational views, respectively, of the pieces of equipment. These templates could be placed on the respective drawings of the buildings and moved around to work out a satisfactory arrangement. This eliminated some of the redrawing that had to be done under the older method of design but there were still many disadvantages. Defects in arrangement were difficult to see, connections were hard to visualize and location problems had to be studied by looking at three or more separate views on the drawings. Many persons whose assistance in the design of the plant would have proved most valuable did not possess the skill requisite to read and understand such drawings. Operating personnel, for example, frequently would be able to make valuable suggestions on location of pieces of equipment, valves, instruments and platforms in an actual building, but do not possess the ability to read drawings sufficiently well to pick out defects in the design and point out improvements.

Proposals have been made to construct three-dimensional scale models of various kinds for educational purposes, e. g., to teach pupils in trade schools the skills of the trade they are studying, to assist architects in explaining to those not skilled in reading drawings what the plans represent, etc., but the model structures suggested for these purposes have not been adaptable for multi-story layout planning or would present numerous disadvantages if the attempt were made to use them for this purpose.

It is among the objects of the present invention to provide a three-dimensional model of the knock-down type capable of being easily assembled to form a multi-story structure useful as an engineering tool to arrive at the best layout of equipment; to provide a model structure in which models of equipment can be removably secured in place, their locations altered and rearranged readily in testing out alternative layouts; to provide a model that facilitates the study of interrelations of equipment as governed by interconnecting piping and services, particularly where piping and services pass through floors; to provide a model of a multi-story structure in which the assembly can be illuminated for observation from all angles; to provide a model which is highly adaptable in representing to scale a wide variety of structures of different sizes and shapes and which lends itself readily to use in the preparation of final drawings of the planned structure.

Other objects and advantages will become apparent from the following detailed description of the invention, taken in conjunction with the drawings, in which.

Figure 1:
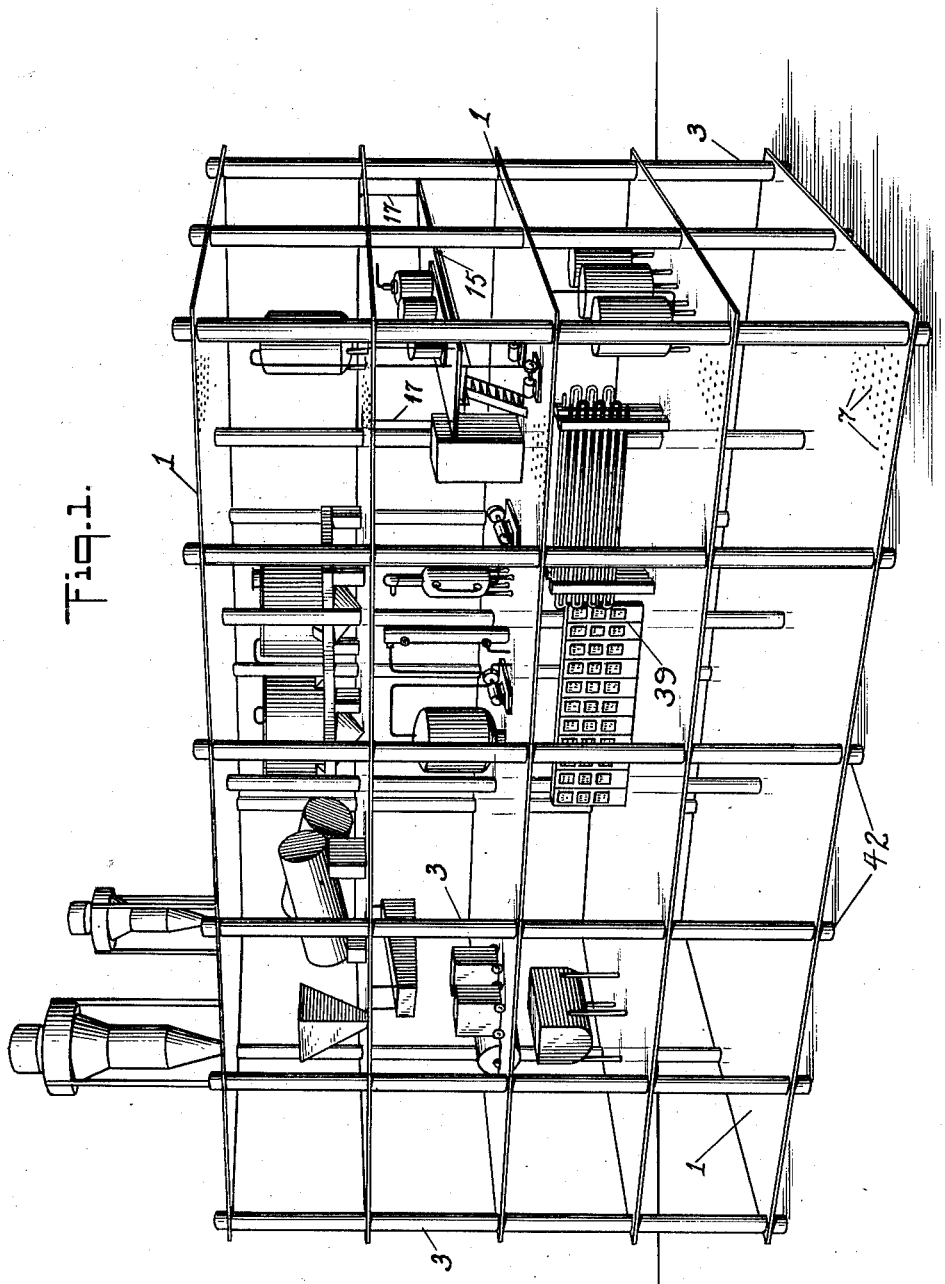
Fig. 1 is a perspective view of a three-dimensional scale model of a chemical plant with pieces of equipment secured in place and with connections between certain pieces of equipment represented.
Figure 2:
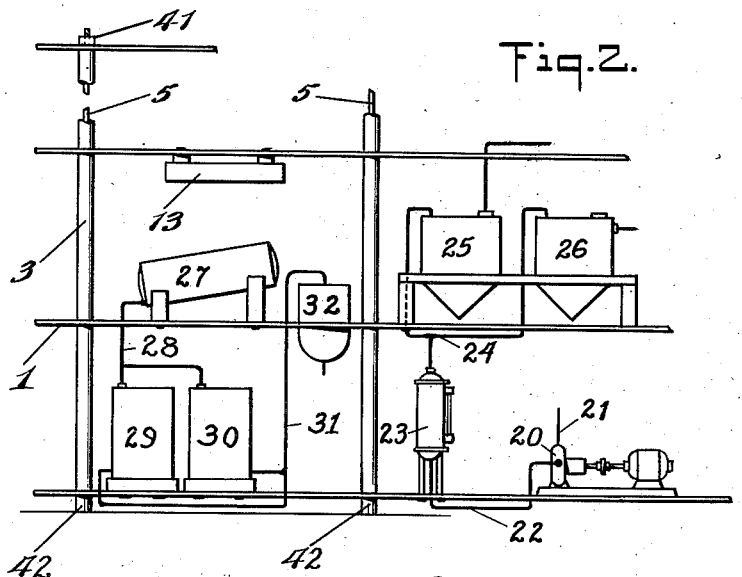
Fig. 2 is a fragmentary elevation of a portion of a model showing in greater detail how equipment templates may be secured to the floor sheets and interconnected with piping.

Referring now more particularly to Figs. 1 and 2, reference numerals 1 represent a plurality of floor sheets rigidly secured together in spaced relation by columns 3 and tie rods 5 passing through the columns and sheets. The assembled parts represent a multi-story industrial building suitable for a chemical plant. The building illustrated is a four story structure, the first floor representing a space for product and/or raw materials storage, the second floor containing the control center for the entire plant and some pieces of equipment, the third and fourth floors housing most of the equipment, and the latter being covered by a flat roof on which other pieces of equipment such as dust separators, etc., may be mounted. The templates or models of pieces of equipment shown in the drawings are illustrative of types of apparatus used in chemical plants, but it is understood that the application of the invention is not limited to any particular type of industrial structure or equipment.

The floor sheets 1 may be made of any suitable materials such as plywood, plastics, steel, aluminum and magnesium alloys, etc., but because of outstanding advantages later pointed out, it is preferred to use sheets of transparent material. Transparent plastic sheets, e. g., Lucite, Lumarith, Celluloid, etc., are highly satisfactory because they possess adequate strength, good resistance to breaking, a high degree of transparency, and are light weight and easily worked, but glass-like materials can be used. The sheets are provided with regularly spaced perforations 7. A preferred arrangement of perforations comprises rows of perforations longitudinally and transversely along straight lines normal to each other and uniformly spaced. The distance between the center lines of the perforations can then be used as scale distances bearing a convenient relation to the actual structure such as would be used for an architect's or engineer's drawing. A convenient layout comprises holes of about $\frac{3}{32}$ inch diameter on ½ inch centers. The distance between center lines of holes ½ inch apart could conveniently represent one foot or two feet, i. e., scales of ½ inch and ¼ inch equal to 1 foot, respectively. A sheet 25 by 50 inches, at these scales, would represent a floor of a structure 50 by 100 or 100 by 200 feet, respectively. This is an adequate size for planning most industrial structures. A scale smaller than ¼ inch equal to 1 foot ordinarily is not desirable because equipment models are too small and, unless a distorted vertical scale is used, it is extremely difficult to manipulate piping connections, fastening means, etc., between floors. Preferably the sheets are of such size that the structure can be represented at scales within the range of ¼ to 1 inch equal to 1 foot. The size of the holes is not critical but they should be large enough to permit the passage of the tie rods 5, wires and thumb tacks for purposes later to be explained, but not so large as to make the support of apparatus models on the floors difficult, or seriously to weaken the sheets mechanically. The perforated sheets should have a high ratio of surface area to open area.

Figure 3:
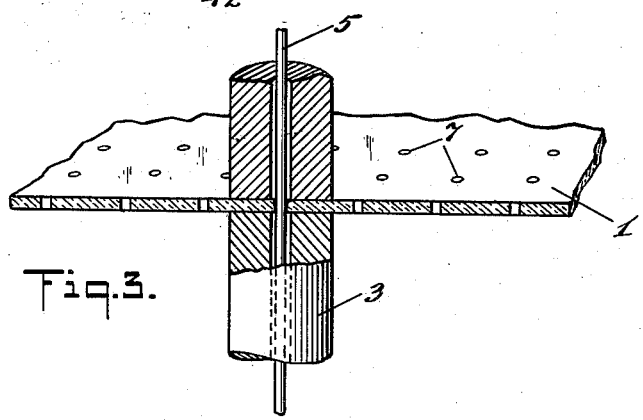
Fig. 3 is a fragmentary perspective view, partly in section, showing details of one form of column construction.

The perforations serve a number of very useful functions in addition to scale representation. They serve to fix the position of supporting columns and permit the passage of fastening devices for the columns, as more particularly illustated in Figs. 3 and 4. They serve to locate and fix the position of templates representing pieces of apparatus. Two such three-dimensional templates 9 and 10 are shown in Fig. 3. These templates or models are also made to scale, preferably of easily worked material such as wood, plastics, etc. They may be either two-dimensional outlines of the apparatus in plan or preferably three-dimensional as shown. When the position of a piece of apparatus has been fixed it can be readily secured in place by thumb tacks or like fastening means 11 for models on one surface of the floor, such as 9, or by double pointed pins 12 for models on both surfaces of the floor, such as 10. In either case the fasteners pass through perforations 7. The template 10 represents a piece of apparatus set in the floor. By making it in two parts as shown, it accurately represents the position of the apparatus without necessitating cutting of the floor sheet. Wall and partition outlines can be marked on the various floors by strips of wood or the like secured to the sheets in proper position by the use of fasteners similar to those shown in Fig. 4. The entire area of the sheets 1 need not be used in all cases as part of the structure. If the proposed building is not rectangular in plan, or is not of such a size as to fill the entire floor area at the scale it is desired to use, the outlines of the floor area are readily marked in the manner described, columns are readily placed in appropriate places, and the portions of the sheets outside those marked areas are disregarded. The foregoing shows how flexible and adaptable the present invention is to represent a wide variety of industrial structures without cutting and waste of the sheet material. The perforations 7 serve also for passage of fastening devices 11 to support templates from the ceiling, as shown at 13 in Fig. 2, or to support apparatus platforms suspended from the ceiling, as shown at 15 in Fig. 1. This platform may be made of perforated sheet material like that of the floor sheets 1 and be held in place by rods 17 serving as hangers therefor.

A further and highly important function served by the perforations is for the passage of wires or other flexible elements from floor to floor through the floors to simulate piping, conduits, etc., leading to and from the pieces of apparatus. The most important gain in the use of a model as an engineering tool in the planning and design of industrial structures is that it makes possible the study of the interrelation of the equipment as governed by the interconnecting piping and services. It has been almost universal experience where a structure such as a chemical plant was planned and designed on paper that defects in the design became apparent only after the actual construction of the plant was in an advanced stage, often necessitating time-consuming and expensive alterations. Such defections are just as apparent in a three-dimensional model as in the actual structure, and they can be corrected with insignificant loss of time and money.

Figure 4:
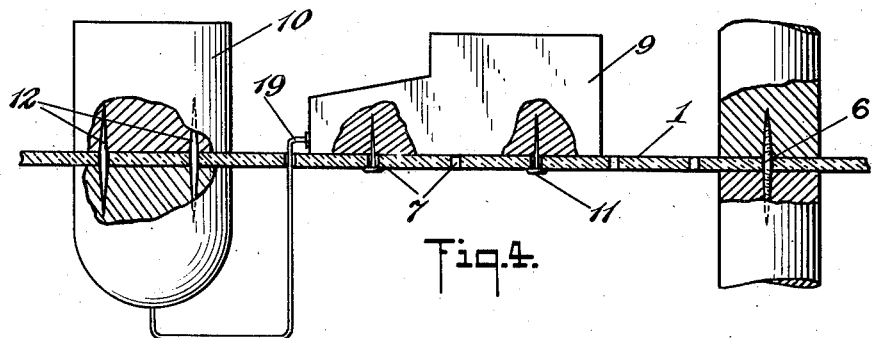
Fig. 4 is a fragmentary elevation showing a different form of column and pieces of equipment secured to a floor sheet with portions in section to show how perforations in the floor sheet can be utilized for fastening elements and passage of piping.

The model of the present invention has high flexibility and adaptability to facilitate the study of interrelation of equipment as governed by interconnection piping and services since alterations and rearrangements not only of the pieces of equipment, but also of the connections, can be made without destroying any of the models or leaving indications of old arrangements which might be confusing. In Fig. 4, for example, a service connection 19 running from the template 9 to the template 10 passes through one of the perforations in the floor sheet 1. Similar connections to other pieces of apparatus are shown in Figs. 1 and 2. In Fig. 2, 20 simulates a mixing pump to which reactants are brought in pipe 21 and from which the mixture is forced through a pipe 22 into a reactor 23 and from the reactor through pipes 24 into a selected holding tank 25 or 26. Similarly drum 27 connects through pipe 28 with tanks 29 and 30 and they in turn through pipe 31 with kettle 32. It is apparent from Figs. 1, 2 and 4 that connections representing piping and the like can readily be made by wires running between templates on the same or different floor sheets through perforations 7. There has been no attempt to illustrate all the necessary connections and services in the drawings for the industrial plant shown, but rather to indicate how such connections can be made with flexible elements. In actual use of the model in designing the plant every necessary connection can be installed, even to the point of bringing connections representing electrical lines, pneumatic lines, etc., to a control board 39 on which models or outlines of the instruments, switches, etc., are provided. Regardless of the number of trial locations and arrangements of templates, connections, columns, etc., used in arriving at the final design, the floor sheets need not be cut or altered in any way. The perforations by their grid-like arrangement along scale lines make it possible quickly to locate the position of a template in reference to other templates, walls, columns, etc., and to make the necessary connections through the floor sheets.

A preferred material for the connections is copper wire covered with colored plastic insulation such as Vinylite. Colored insulation on the wire affords means of using a color code to distinguish between services such as electrical conduits, water lines, steam lines, pneumatic lines, sewer piping, etc., and between different process piping carrying various chemicals, intermediates or products.

The columns 3 may be made of any suitable material and of any desired cross-section. They may be made to the same scale in length as the spacing of the perforations in the floor sheets 1 or, if desired, the vertical scale can be different so as to provide more ready access to the interior of the model for placing the templates, manipulating connections, etc. While it is not generally necessary to mount walls and partitions in the model, this can readily be done by grooving the columns longitudinally to receive the edges of the partition and wall members. These members, if used, preferably are made of transparent materials like the floor sheets and they may be perforated or not. If desired, the columns can be made of short sections of definite length and be built up to any desired length between floors, each section representing one or more unit lengths in scale.

The tie rods 5 illustrated in the drawing are threaded at each end and the assemblage is held together by nuts 41 screwed onto the ends of the tie bolts. These nuts may be countersunk in stubs 42 which serve as short supports at the base, as shown in Fig. 1, or they may be ordinary square or hexagonal nuts, as shown in Fig. 2. The tie rods may also be made in sections corresponding in length to the column sections and fastened together with sleeve connectors, for example. The invention also contemplates other forms of fastening devices to hold the column sections together. Columns 3, in Fig. 4, are solid and held together in axial alignment on opposite sides of sheet 1 by dowel-like connections, either friction or threaded, as indicated by double pointed screws 6.

After the industrial structure has been planned and designed with the aid of the three-dimensional scale model and the model is complete with templates, connections, etc., it can be used to great advantage for a number of purposes. The necessary tracings for blue prints can be quickly made directly from the model. By reason of the transparent floor sheets, all parts of the entire model are readily observable from any angle so that the draftsman simply has to translate to the drawing what is already present in the model. Operators of the new plant or layout can be instructed in and trained for their duties with the aid of the model. After the plant is in operation, the model can be used in working out improved layouts as new requirements arise, or for reference by the foreman in describing to mechanical and operating crews such things as maintenance work, operating difficulties and minor changes. When it has no further use, the model can be taken down and the parts stored in compact form for subsequent use in designing new structures.

The elements of the combination of the invention are preferably packaged in knock-down condition for transportation and sale. Such a package or model building set would include as essential elements a plurality of perforated sheets 1, a plurality of column or column sections and means adapted to pass through perforations in the sheets to fasten the columns and sheets into a self-sustaining structure. The set may conveniently include coils of wire of various colors for making the connections. Tie rod material in long lengths can be supplied along with a small die for threading the ends of pieces cut therefrom to the desired length. The column material similarly may be supplied in long length drilled out for the tie rods, or, if made of solid material, double pointed fasteners may be furnished for fastening the columns and sheets together. With these basic elements, and with scale models of the pieces of equipment that are to be used in the plant to be designed which can be obtained from other sources, the three-dimensional scale model of the multi-story structure can readily be assembled for use as described.

Although the invention has been described in connection with certain preferred embodiments, it will be apparent that modifications and variations can be resorted to without departing from the scope of the invention as defined in the following claims.

I claim:

1. A three-dimensional scale model of an industrial structure comprising a rigid sheet adapted to represent a floor of said structure and having regularly spaced perforations of small size compared to the intervening spaces, a two piece model adapted to represent a single piece of equipment set in said floor, and fastening devices adapted to pass through perforations in said sheet and into both pieces of said model.

2. A three-dimensional model of an industrial structure comprising a plurality of sheets, each sheet being a plane of rigid material having regularly spaced perforations forming a scale grid of sufficient area to represent to scale an entire floor of said structure, means spacing said sheets and securing them together through some of said perforations to form a unitary multi-story structure, models representing pieces of apparatus used in said structure mounted on different sheets by fastening means passing through other of said perforations, and wires representing service connections between pieces of apparatus passing through still other of said perforations.

LOWELL A. LEDGETT.

(References on following page)

REFERENCES CITED

The following references are of record in the file of this patent:

UNITED STATES PATENTS

| Number | Name | Date |
|---|---|---|
| 311,793 | Stranders | Feb. 3, 1885 |
| 1,329,850 | Pye | Feb. 3, 1920 |
| 1,488,872 | Fairchild | Apr. 1, 1924 |
| 1,801,724 | Conklin | Apr. 21, 1931 |
| 1,912,380 | McCully | June 6, 1933 |
| 1,981,646 | Hamley | Nov. 20, 1934 |
| 2,127,047 | Pinney | Aug. 16, 1938 |
| 2,284,458 | Van Antwerp | May 26, 1942 |

FOREIGN PATENTS

| Number | Country | Date |
|---|---|---|
| 422,652 | Great Britain | 1935 |

OTHER REFERENCES

Scientific American, Sept. 1944, page 132, photostat copy.